United States Patent
Kass et al.

(10) Patent No.: US 9,832,437 B2
(45) Date of Patent: Nov. 28, 2017

(54) COLOR SEQUENTIAL DISPLAY

(71) Applicant: Magic Leap, Inc., Dania Beach, FL (US)

(72) Inventors: Michael Kass, Berkeley, CA (US); Douglas Bertram Lee, Redwood City, CA (US)

(73) Assignee: MAGIC LEAP, INC., Plantation, FL (US)

( * ) Notice: Subject to any disclaimer, the term of this patent is extended or adjusted under 35 U.S.C. 154(b) by 23 days.

(21) Appl. No.: 14/992,958

(22) Filed: Jan. 11, 2016

(65) Prior Publication Data

US 2016/0241827 A1 Aug. 18, 2016

Related U.S. Application Data

(60) Provisional application No. 62/102,740, filed on Jan. 13, 2015.

(51) Int. Cl.
*G06F 3/01* (2006.01)
*H04N 9/31* (2006.01)
*H04N 9/67* (2006.01)

(52) U.S. Cl.
CPC .......... *H04N 9/3182* (2013.01); *G06F 3/01* (2013.01); *G06F 3/013* (2013.01); *H04N 9/312* (2013.01); *H04N 9/3111* (2013.01); *H04N 9/3155* (2013.01); *H04N 9/3164* (2013.01); *H04N 9/67* (2013.01)

(58) Field of Classification Search
CPC .......... G06F 3/013; G06F 3/01; H04N 9/312; H04N 9/67; H04N 9/3155; H04N 9/3182; H04N 9/3164
See application file for complete search history.

(56) References Cited

U.S. PATENT DOCUMENTS

| | | |
|---|---|---|
| 2004/0178974 A1 | 9/2004 | Miller et al. |
| 2007/0176859 A1 | 8/2007 | Cok et al. |
| 2008/0111502 A1 | 5/2008 | Kim et al. |
| 2010/0013748 A1 | 1/2010 | Cok et al. |
| 2010/0117999 A1* | 5/2010 | Matsunaga ............ H05B 33/12 345/204 |
| 2013/0241805 A1 | 9/2013 | Gomez |
| 2015/0179137 A1* | 6/2015 | Miller .................. G09G 3/2003 345/690 |

OTHER PUBLICATIONS

PCT International Search Report and Written Opinion for International Application No. PCT/US16/12902, Applicant Magic leap, Inc., forms PCT/ISA/210, 220, and 237, dated Jul. 18, 2016 (16 pages).

* cited by examiner

*Primary Examiner* — Abbas Abdulselam
(74) *Attorney, Agent, or Firm* — Vista IP Law Group, LLP

(57) ABSTRACT

Described are improved approaches to implement color sequential displays that can mitigate problems with conventional display technologies. Color-breakup is mitigated by modifying the original color channels and adding one or more additional color channels derived from the original ones.

27 Claims, 11 Drawing Sheets

COLOR SEQUENTIAL DISPLAY

CROSS-REFERENCE TO RELATED APPLICATIONS

This application claims the benefit of priority to U.S. Provisional Application No. 62/102,740, filed on Jan. 13, 2015, which is hereby incorporated by reference in its entirety.

BACKGROUND

The foundation of many modern display technologies is premised upon the fact that the range of human-perceivable colors can be well represented by summing three or more appropriately chosen color primaries—usually Red, Green, and Blue ("RGB"). These primary colors can be added up in various ways to reproduce a broad range of different colors.

Certain display technologies supply the colors sequentially—for example, producing a red image followed by a green image followed by a blue image. This type of display technology is often called "color sequential", "field sequential", or "field-sequential color" (hereinafter collectively referred to as "color-sequential"). Color-sequential displays work because of persistence of vision. If the different colored images (fields) are presented quickly enough in sequence, the human eye will merge them into a full-color image. Popular examples of color-sequential displays include certain LCOS (liquid crystal on silicon) panels and DMD (digital mirror devices).

Conventional color-sequential display technologies suffer from the possibility of color-breakup because the different color primaries are presented at different times. If the observer's head or eye moves during the presentation of a desired image, the different fields will fall on different locations of the observer's retina, and there can be a perception that the fields are mis-registered. A common complaint when looking at field-sequential displays is that rainbows can be seen on the boundaries of bright white regions against dark backgrounds.

Therefore, there is a need for an improved approach to mitigate these and other artifacts of color-sequential displays.

SUMMARY

Some embodiments of the present invention provide an improved approach to implement color sequential displays that can mitigate the above-described problems with conventional display technologies. Embodiments of the current invention can reduce color-breakup by modifying the original color channels and adding one or more additional color channels derived from the original ones.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

The drawings illustrate the design and utility of embodiments of the present invention, in which similar elements are referred to by common reference numerals. In order to better appreciate the advantages and objects of embodiments of the invention, reference should be made to the accompanying drawings. However, the drawings depict only certain embodiments of the invention, and should not be taken as limiting the scope of the invention.

DETAILED DESCRIPTION OF THE EMBODIMENTS OF THE INVENTION

The present disclosure describes approaches to implement improved color sequential displays. As noted above, existing color-sequential display technologies suffer from the possibility of color-breakup because the different color primaries are presented at different times. If the observer's head or eye moves during the presentation of a desired image, the different fields will fall on different locations of the observer's retina, causing an image artifact to appear to the viewer of the display.

Figure 1A:
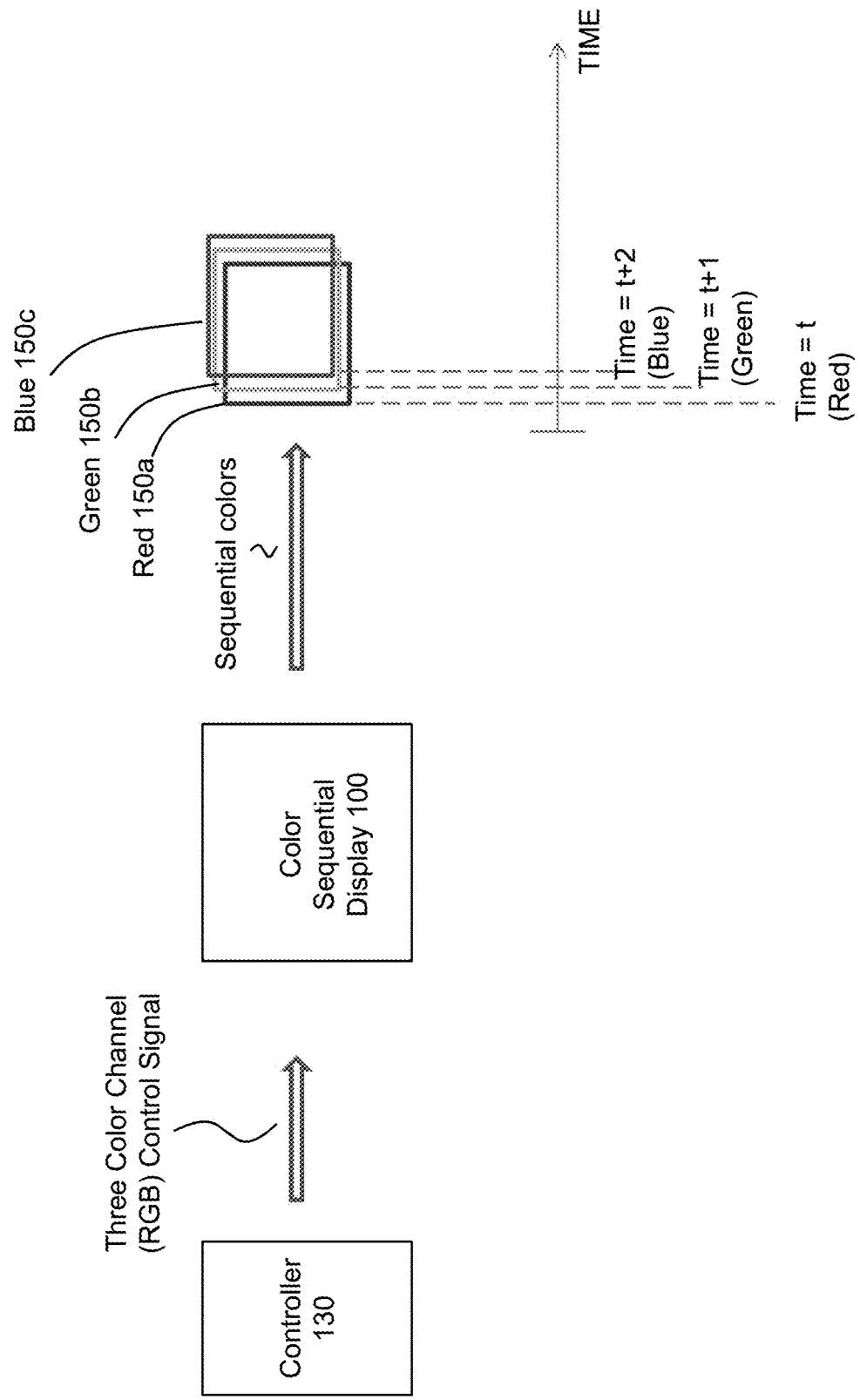
FIGS. 1A and 1B illustrate problems associated with color break-up.
Figure 1B:
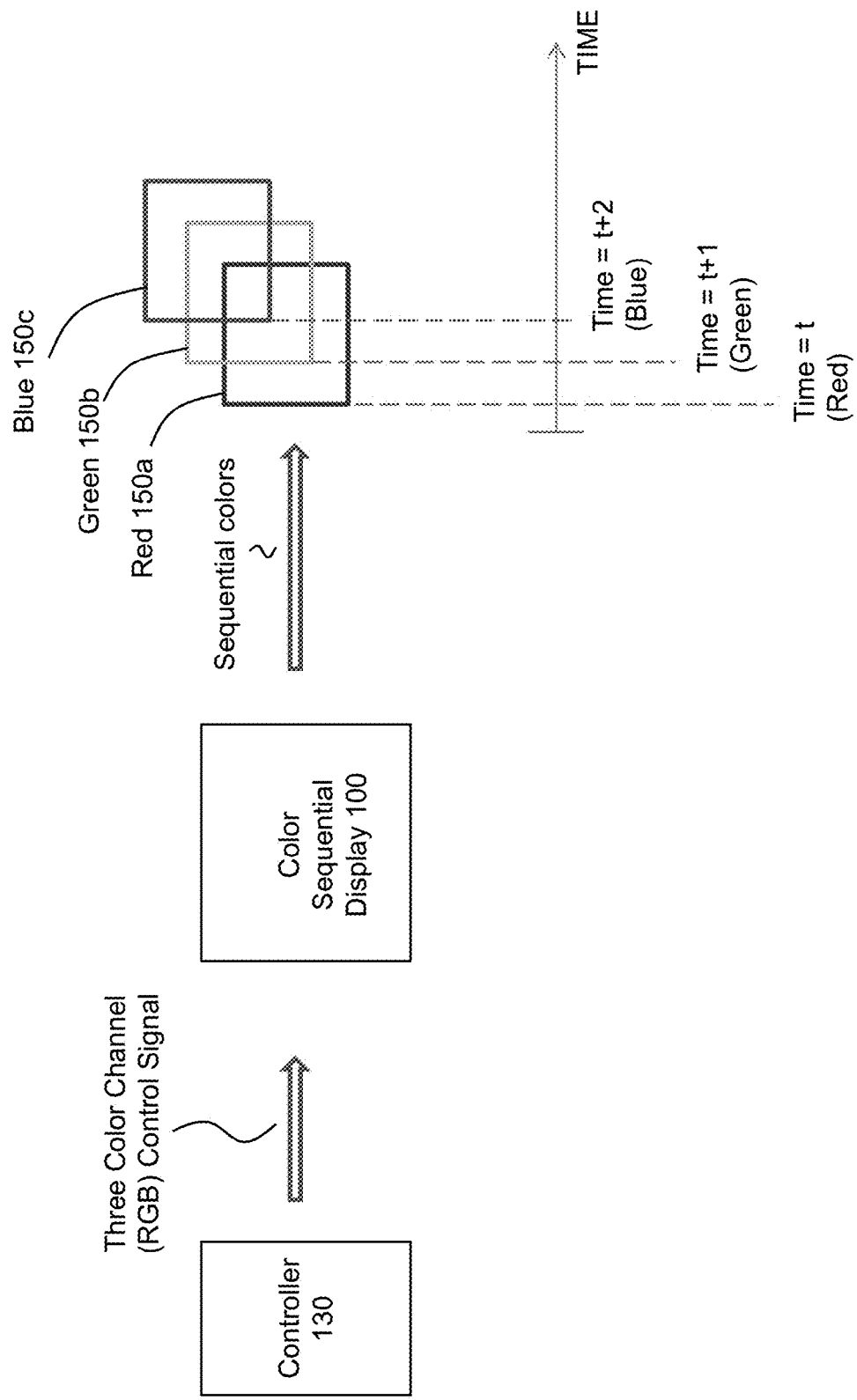

To explain, consider the color sequential display 100 shown in FIGS. 1A and 1B. With these types of displays, an image is represented by a set of color channels, for example red, green and blue. A controller 130 is employed to generate the control signals that control the generation of the different color channels in the color sequential display 100. Each pixel generated by the color sequential display 100 may correspond to a red channel 150*a*, green channel 150*b*, and blue channel 150*c*.

As show in FIG. 1A, if the observer's head or eye is stationary or has very little movement, then the different color channels 150*a*, 150*b*, and 150*c* for a given pixel will fall at exactly or approximately the same location on the observer's retina. This is the best-case scenario, and will not result in the presence of color break-up artifacts due to the close overlap of the different color channels.

However, as shown in FIG. 1B, if the observer's head or eye moves during presentation of a desired image, the different color channels 150*a*, 150*b*, and 150*c* will fall on distinguishably different locations to the observer's retina. This results in a perceptible image artifact that appear to the observer due to color-breakup, since the different color primaries are presented at different times to the observer. Since the different color fields for a given pixel are now effectively mis-registered to the observer, this may cause the field-sequential display to produce imaging problems, such as rainbows that can be seen on the boundaries of bright white regions against dark backgrounds.

Embodiments of the current invention can reduce color-breakup by modifying the original color channels and adding one or more additional color channels derived from the original ones. To explain, consider the illustration of FIG. 2. The left portion of this figure shows a conventional set of three color channels, including a red channel 250a-1, green channel 250b-1, and blue channel 250c-1.

Each color channel is represented by a collection of pixels. The pixels are identified by indices. In the most common usage, the pixels form a rectangular grid, and can be identified by row and column indices (i,j). For each color channel, for each set of indices, there is a number providing the intensity of the color channel at the location specified by the indices. For example, for a red channel, the intensity values may be denoted as r(i,j). Similarly, for a green channel, one may denote the intensity by g(i,j), and similarly the blue channel may be denoted as b(i,j). Here, the intensity of the red channel 250a-1 is 100, the intensity of the green channel 250b-1 is 120, and the intensity of the blue channel 250c-1 is 140.

In the left portion of the figure, as discussed above, rapid movement of the head or eye can cause color-breakup. This is because the full intensities of the different color primaries are presented at different times to the viewer in a spaced-apart manner. Thus, the entirety of the red intensity of 100 is presented at a first location on the observer's retina at time t, the entirety of the green intensity of 120 is presented at a second location on the observer's retina at time t+1, and the entirety of the blue intensity of 140 is presented at a third location on the observer's retina at time=t+2.

In the inventive approach shown on the right-hand side of the figure, a white color channel 252 is provided. The white color channel 252 will represent a portion of the overall intensity that is common to all of the other channels. For example, here, each of red-green-blue channels all corresponds to at least an intensity of 100 (red at 100, green at 120, and blue at 140). Therefore, the white channel can be configured to have an intensity of 100 (which is formed of 100 intensity of the red color, 100 intensity of the green color, and 100 intensity of the blue color).

As a result, only the remaining portions of each color beyond 100 needs to be included into the dedicated color channel for that color. Therefore, the red channel 250a-2 no longer needs to have any intensity at all, since the intended amount of red color for the pixel is already represented in the white color channel 252. The green channel 250b-2 only needs to have an intensity of 20, since 100 of the originally intended amount of 120 for the green color for the pixel is already represented in the white color channel 252. Similarly, the blue channel 250c-2 only needs to have an intensity of 40, since 100 of the originally intended amount of 140 for the blue color for the pixel is already represented in the white color channel 252.

The reason this approach significantly reduces color-breakup is because much smaller quantities of the red-green-blue intensities are presented to the observer at the different times in their dedicated color channels. This is because much of the overall intended intensities of the red, green, and blue channels are now represented by the new white channel 252. The approach of the left portion of the figure corresponds to significantly higher intensities for the colors at different locations and points in time (100 for red, 120 for green, and 140 for blue). In contrast, the approach of the right portion of the figure corresponds to significantly lower intensities for the colors at different locations and points in time (0 for red, 20 for green, and 40 for blue).

Figure 3:
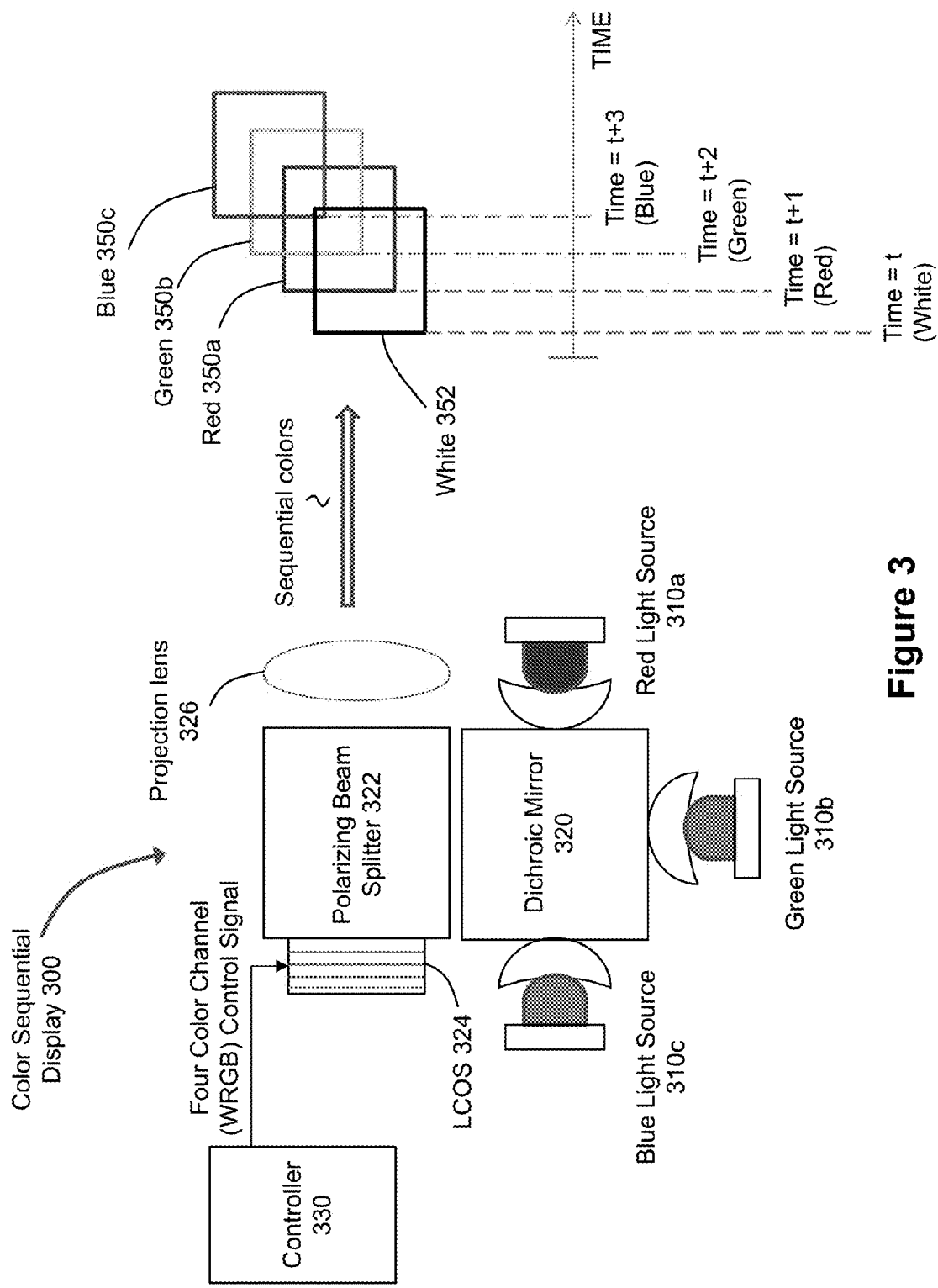
FIG. 3 illustrates an example approach to implement some embodiments of the invention.

FIG. 3 illustrates an example approach to implement some embodiments of the invention. A color sequential display 300 is provided to generate a set of sequential color channels for a given image, to implement a panel of pixels that are either reflective or transmissive. The reflectance or transmissivity of the display may be first adjusted to correspond to the first color channel (red, for example). Then the panel is illuminated with the corresponding color of light (red). Next, the reflectance or transmissivity of the display is adjusted to correspond to the second color channel (green, for example). Then the panel is illuminated with the corresponding color of light (green). Next, the reflectance or transmissivity of the display is adjusted to correspond to the third color channel (blue, for example). Then the panel is illuminated with the corresponding color of the light (blue). In the present invention, additional one or more channels may be generated, e.g., corresponding to illumination of white color for a white color channel.

The color sequential display 300 includes a mechanism to generate light sources for the different primary colors, including a red light source 310a, green light source 310b, and blue light sources 310c. For example, the red light source 310a, green light source 310b, and blue light sources 310c may be implemented using a solid state lighting technology (e.g., LEDs), or by implementing a lamp that uses color filtering to generate the primary colors. A color wheel may also be used to separate light into the primary colors. Alternatively a beam splitter may also be used to generate the primary colors.

A dichroic mirror 320 may be used to pass the generated light to a polarizing beam splitter 322 that directs the light to one or more LCOS chips 324. The light from the LOCS chip 324 is then reflected back through the polarizing beam splitter 322 to a projection lens 326.

A controller 330 controls the operation of the color sequential display 300 such one or more additional color channels are included with the RGB color channels. The controller may be implemented as a hardware-based controller chip, software, or a combination of hardware and software. An example architecture that can be used to implement the controller 330 is described below relative to FIG. 9.

In some embodiments, the operation of controller 330 causes the color sequential display 300 to generate a set of sequential color channels, including white channel 352, red channel 350a, green channel 350b, and blue channel 350c.

Figure 4:
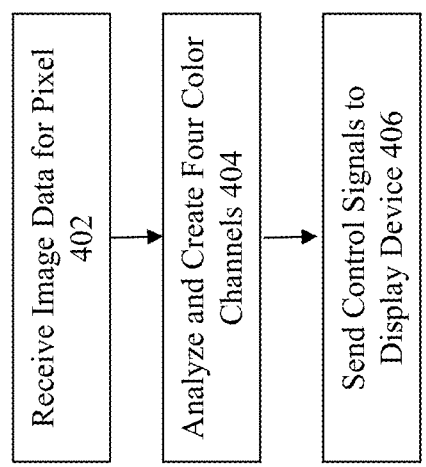
FIG. 4 shows a flow chart of the operation of controller according to some embodiments of the invention.

FIG. 4 shows a flow chart of the operation of controller 330 according to some embodiments of the invention. As previously noted, the current embodiment of the invention reduces color-breakup by modifying the original color channels and adding one or more additional color channels derived from the original ones.

At 402, the image data to be displayed is received by the system. The original image likely contains three input color channels. The color channels are red: r(i,j), green: g(i,j) and blue: b(i,j).

At 404, the image data is analyzed so that an additional color channel for white can be created, white: w(i,j). In some embodiment, at each pixel, the value of w(i,j) is computed by the formula:

$$\text{White: } w(i,j) = \min(r(i,j), g(i,j), b(i,j)).$$

Each of the new color channels are then modified as follows:

$$\text{Red: } r'(i,j) = r(i,j) - w(i,j).$$

$$\text{Green: } g'(i,j) = r(i,j) - w(i,j).$$

$$\text{Blue: } b'(i,j) = b(i,j) - w(i,j).$$

Then, at 406, the display will sequentially show the four fields as follows:
1. White: w(i,j) illuminated by white light;
2. Red: r'(i,j) illuminated by red light;
3. Green: g'(i,j) illuminated by green light; and
4. Blue: b'(i,j) illuminated by blue light.

It is noted that the four fields may be displayed in any order according to the present embodiment. Therefore, the ordering shown above is merely illustrative.

The possible issue with the above approach in some displays is that it may provide a bigger challenge to make black colors as black as possible. This is because the addition of a white channel may produce greater amounts of light that is reflected for pixels intended to be black in color (due to the additional white color displayed for the white channel).

An alternate embodiment will now be described to address this issue. In the alternate embodiment, only a portion of the possible intensity is provided into the white channel instead of flashing all of the total possible light that can be placed into the white channel. This means that the white channel will receive relatively less light and the dedicated RGB channels will receive relatively more light. By doing so, this may reduce the amount of mitigation for the color break-up issue, but will allow for better black color reproduction.

Figure 5:
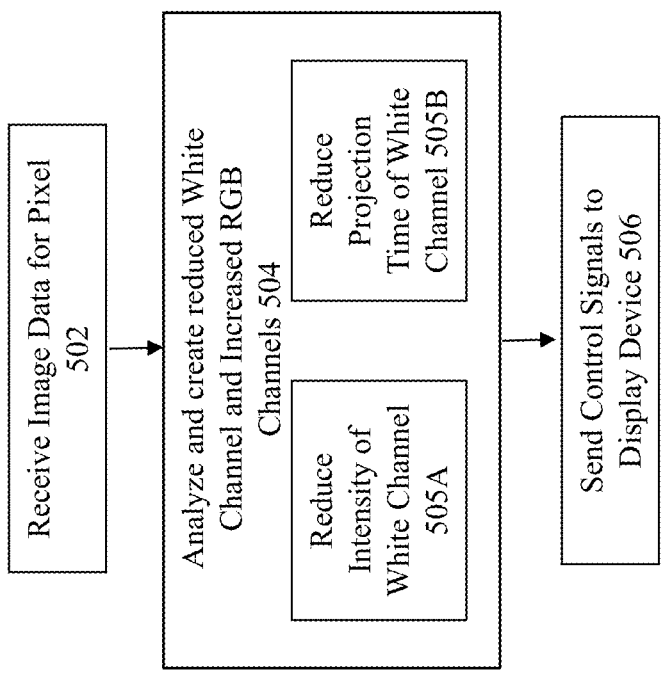
FIG. 5 shows a flowchart of an alternate approach to implement embodiments of the invention.

FIG. 5 shows a flowchart of an approach to implement this embodiment of the invention. At 502, the image data to be displayed is received by the system. The original image likely contains input three color channels. The color channels are red: r(i,j), green: g(i,j) and blue: b(i,j).

At 504, the image data is analyzed so that an additional color channel for white can be created, white: w(i,j), where the white channel is reduced by a certain amount improve the reproducibility of black color. At 506, control signals corresponding to these channels are sent to be implemented by the color sequential display.

There are potentially different ways to determine the white channel. A first approach is represented at 505A, which corresponds to a reduction of the white channel value. The white channel may be computed by the following formula:

$$w(i,j) = \text{alpha} * \min(r(i,j), g(i,j), b(i,j)) \text{ where alpha} < 1.0.$$

The r', g' and b' channels would be computed as before, but increased by the exact amount by which white was decreased. Then the w channel would be illuminated by white light reduced in intensity by a factor of the alpha value.

Figure 6A:
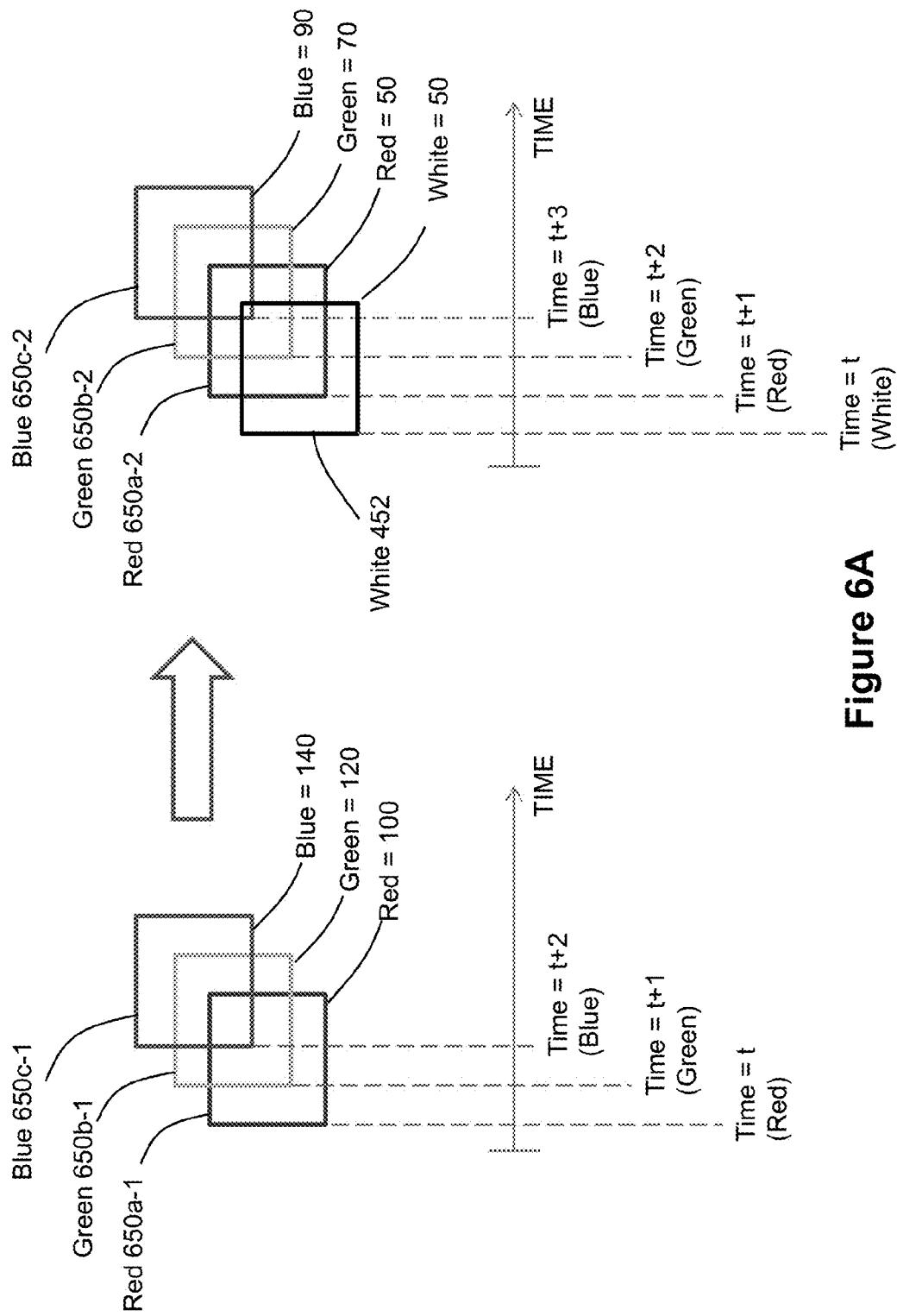
FIGS. 6A and 6B illustrate some embodiments of the invention.

FIG. 6A illustrates this approach. The left portion of this figure shows a conventional set of three color channels, including a red channel 650a-1, green channel 650b-1, and blue channel 650c-1. Here, the intensity of the red channel 650a-1 is 100, the intensity of the green channel 650b-1 is 120, and the intensity of the blue channel 650c-1 is 140.

Figure 2:
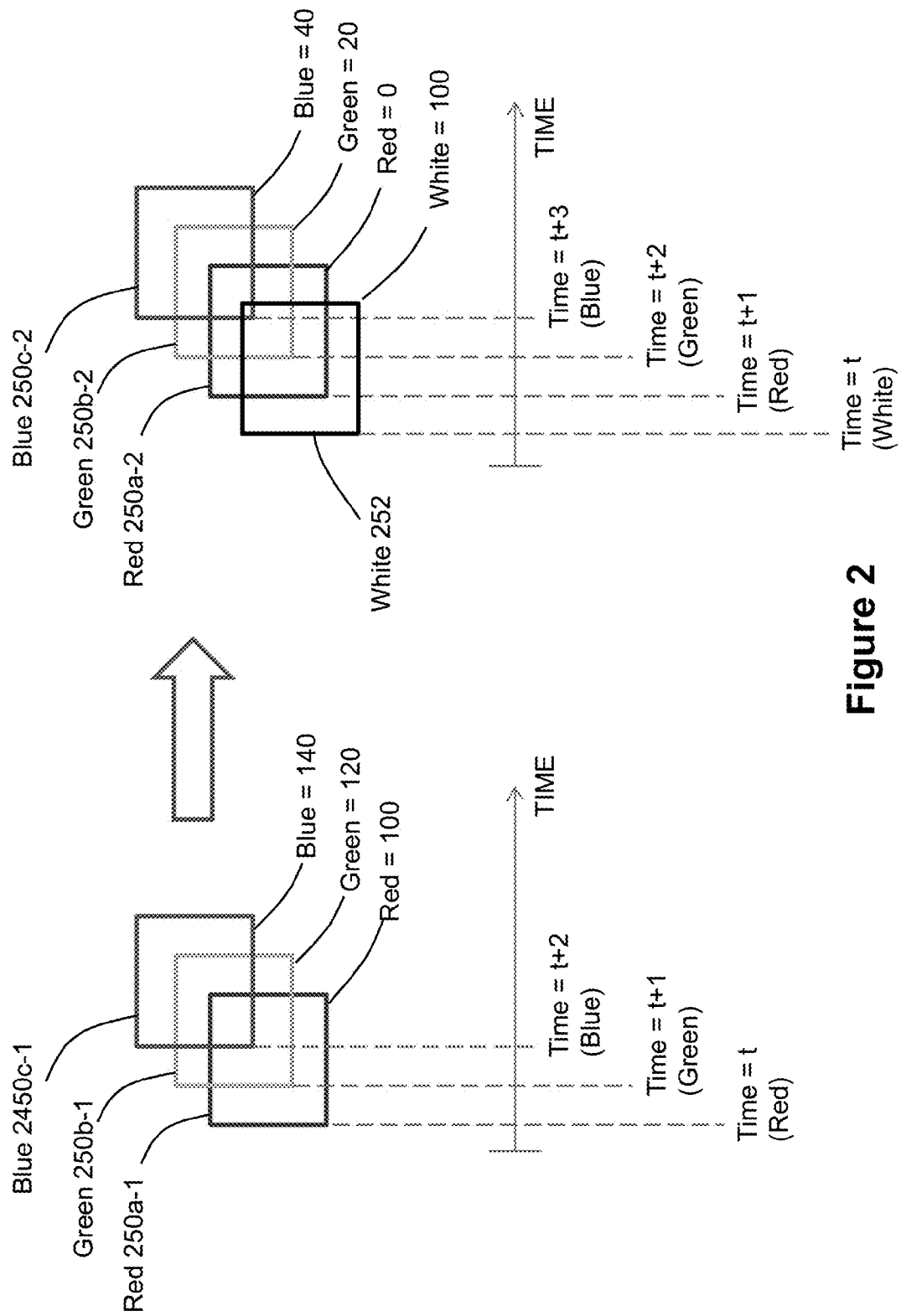
FIG. 2 illustrates an embodiment of the invention.

Recall that the first embodiment represented in FIG. 2 resulted in a white color channel 252 that was provided, where the white color channel 252 represent the entirety of the overall intensity that is common to all of the other channels. Therefore, since each of red-green-blue channels all corresponds to at least an intensity of 100 (red at 100, green at 120, and blue at 140), the white channel can be configured to have an intensity of 100 (which is formed of 100 intensity of the red color, 100 intensity of the green color, and 100 intensity of the blue color). As a result, only the remaining portions of each color beyond 100 needs to be included into the dedicated color channel for that color.

Therefore, the red channel 250a-2 no longer needs to have any intensity at all, since the intended amount of red color for the pixel is already represented in the white color channel 252. The green channel 250b-2 only needs to have an intensity of 20, since 100 of the originally intended amount of 120 for the green color for the pixel is already represented in the white color channel 252. Similarly, the blue channel 250c-2 only needs to have an intensity of 40, since 100 of the originally intended amount of 140 for the blue color for the pixel is already represented in the white color channel 252.

In the approach of FIG. 6A, assume that an alpha value of 0.5 is used for the formula w(i,j)=alpha*min(r(i,j), g(i,j), b(i,j)). In this situation, the intensity of the white channel 652 is now 50 (0.5*100), which is 50 less than the previous amount of 100.

As a result, each of the other channels is increased by that same amount. Therefore, the red channel 650a-2 is now configured to have an intensity of 50 (which is 50 more than the previous intensity of 0). The green channel 650b-2 is now configured to have an intensity of 70 (which is 50 more than the previous intensity of 20). The blue channel 650c-2 is now configured to have an intensity of 90 (which is 50 more than the previous intensity of 40).

A second possible approach is represented at 505B, which corresponds to a reduction of the amount of projection time for the previous white channel value. The white channel may be computed by the previously-described formula:

$$w(i,j) = \min(r(i,j), g(i,j), b(i,j)) \text{ for time } t * \text{alpha where alpha} < 1.0$$

The r', g' and b' channels would be computed as before, but increased by the exact amount by which the total for white was decreased when taking the projection time into account. Then the w channel would be illuminated by white light which is not reduced in intensity, but is instead reduced in projection time by a factor of the alpha value.

Figure 6B:
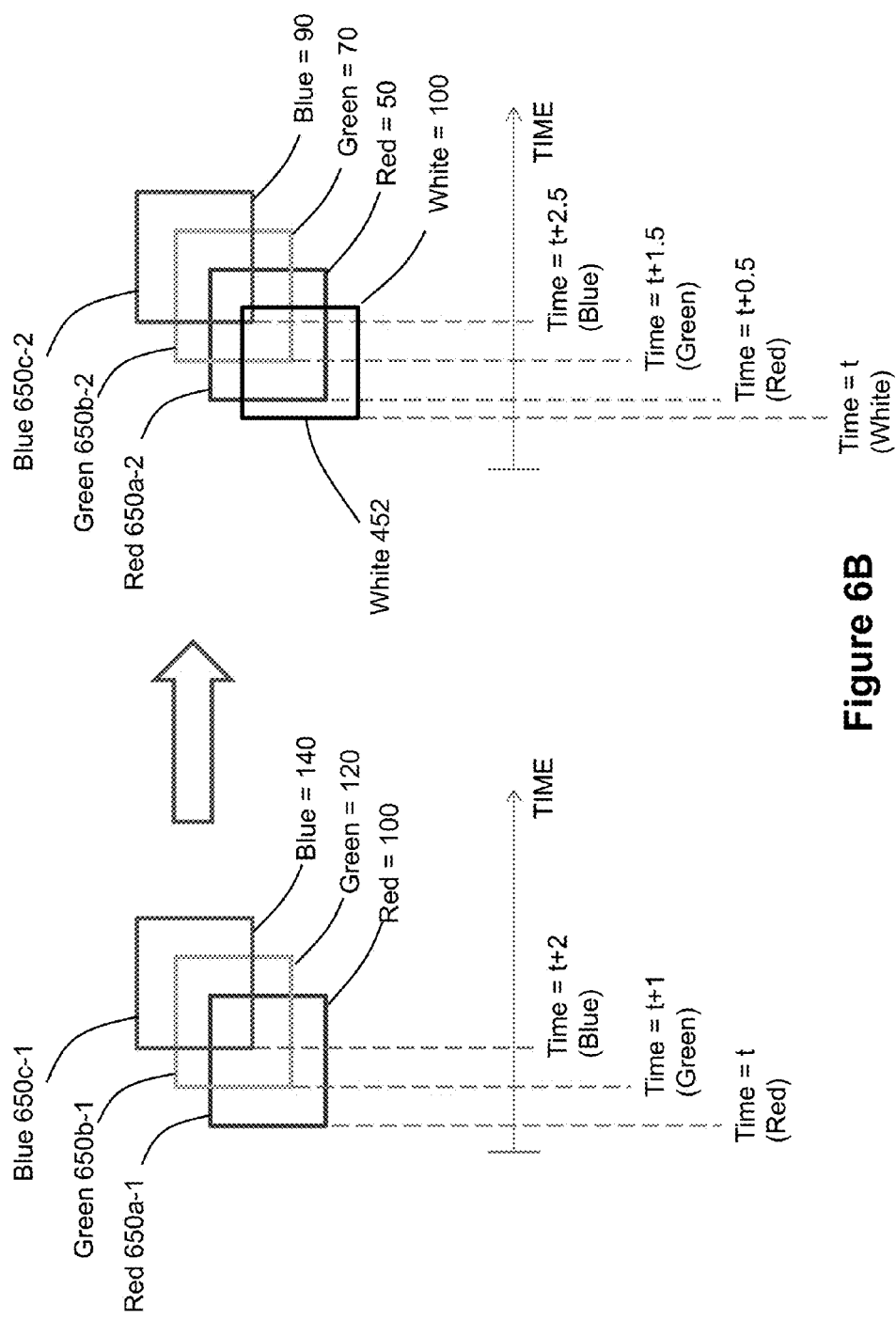

FIG. 6B illustrates this approach. As before, the left portion of this figure shows a conventional set of three color channels, including a red channel 650a-1, green channel 650b-1, and blue channel 650c-1. Here, the intensity of the red channel 650a-1 is 100, the intensity of the green channel 650b-1 is 120, and the intensity of the blue channel 650c-1 is 140.

In the approach of FIG. 6B, assume that an alpha value of 0.5 is used such that the white channel is set at an intensity of 100, but has a projection time of one-half of its normal time. In this situation, the intensity of the white channel 652 is 100, but since the projection time is one-half of normal, the total intensity for the white channel is still 50 (0.5 time*100 intensity), which is the same overall intensity as the approach of FIG. 6A.

As a result, each of the other channels is increased by that same amount as was derived for the approach of FIG. 6A. Therefore, the red channel 650a-2 is now configured to have an intensity of 50. The green channel 650b-2 is now configured to have an intensity of 70. The blue channel 650c-2 is now configured to have an intensity of 90.

While the above embodiments show only a single additional white channel being added to the RGB channels, it is noted that the inventive concept is applicable to any number of additional color channels. For example, the additional channels could be w, rg (red-green), gb (green-blue), br (blue-red), and the modified channels would be r", g" and b". The white channel w would be computed as described above (e.g., w(i,j)=min(r(i,j), g(i,j), b(i,j))).

The rg, gb and rb channels can be computed as follows:

$$rg(i,j)=\min(r'(i,j),g'(i,j)).$$

$$gb(i,j)=\min(b'(i,j),g'(i,j)-rg(i,j))$$

$$br(i,j)=\min(r'(i,j)-rg(i,j),b'(i,j)-gb(i,j))$$

Finally, the adjusted red, green and blue channels can be computed as follows:

$$r''(i,j)=r'(i,j)-rg(i,j)-br(i,j)$$

$$g''(i,j)=g'(i,j)-rg(i,j)-gb(i,j)$$

$$b''(i,j)=b'(i,j)-gb(i,j)-br(i,j)$$

The white channel would be illuminated with the red, green and blue light (adding up to white). The rg channel would be illuminated with red and green. The gb channel would be illuminated with green and blue. The br channel would be illuminated with blue and red. The r'' channel would be illuminated with red, the g'' channel with green and the b'' channel with blue. Again, these channels could be displayed in any order.

Figure 7:
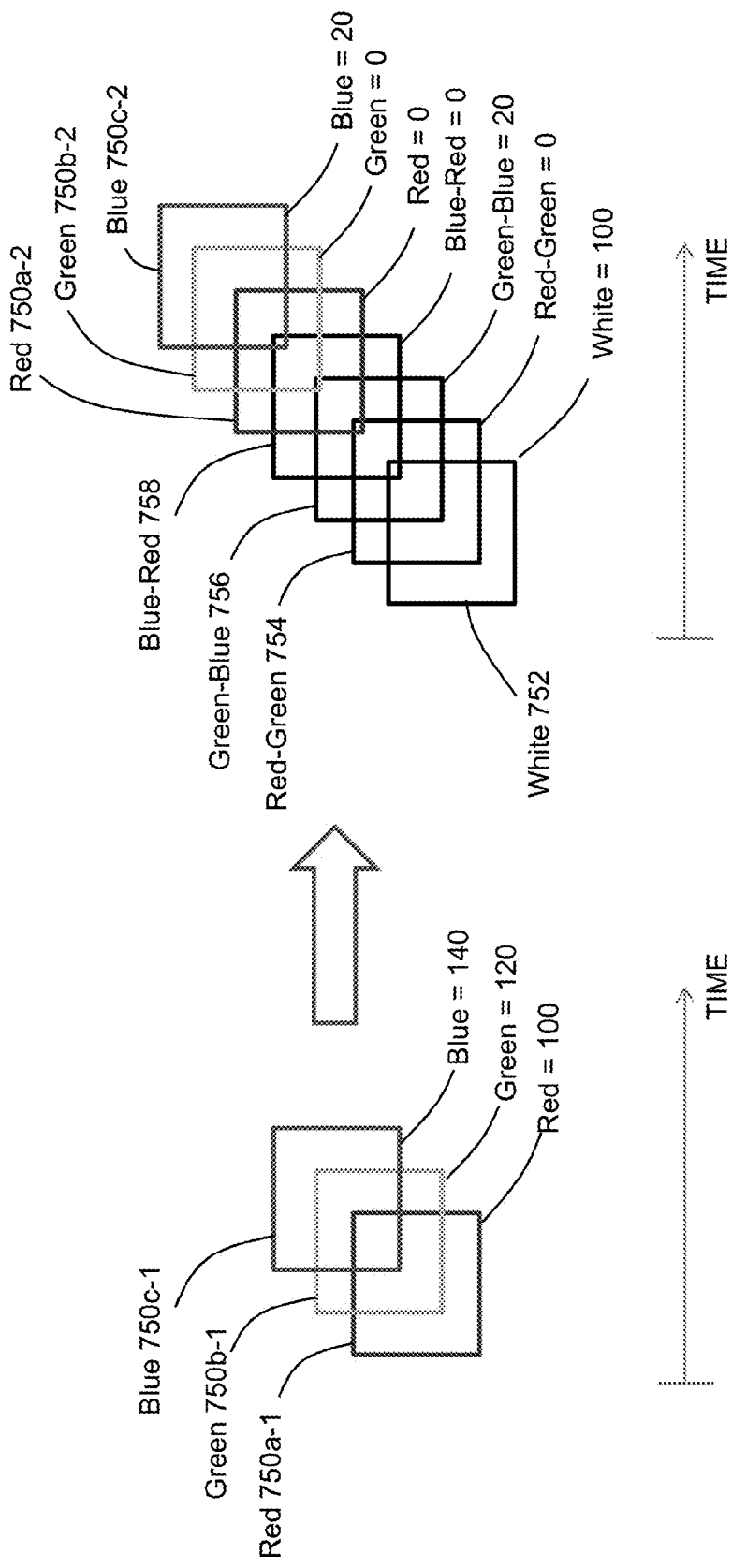
FIG. 7 illustrates additional color channels.

FIG. 7 illustrates an application of this embodiment to the previous example. As before, the left portion of this figure shows a conventional set of three color channels, including a red channel 750a-1, green channel 750b-1, and blue channel 750c-1. Here, the intensity of the red channel 750a-1 is 100, the intensity of the green channel 750b-1 is 120, and the intensity of the blue channel 750c-1 is 140.

The right-hand side of the figure shows the intensities when the additional color channels are taken into account. Here, the white channel is 100 as before (minimum of red color (100), green color (120), and blue color (140)). By setting w to 100, this leave 0 remaining for red (100-100), 20 remaining for green (120-100), and 40 remaining to blue (140-100).

The rg channel 754 is 0 (minimum of remaining red (0) and remaining green (20)). The gb channel 756 is 20 (minimum of remaining green (20) and remaining blue (40). By setting gb to 20, this leave 0 remaining for green (20-20), and 20 remaining for blue (40-20). The br channel 758 is 0 (minimum of remaining blue (20) and remaining red (0)). The r channel 750a-2 is 0 (remaining red is 0). The g channel 750b-2 is 0 (remaining green is 0). The b channel 750c-2 is 20 (remaining blue is 20).

It is noted that the approaches described herein may not necessarily need to be implemented for every pixel in a given image. Instead, analysis may be performed to dynamically determine whether or not the additional color channels should be implemented. Any suitable set of criteria may be used to make this determination.

Figure 8:
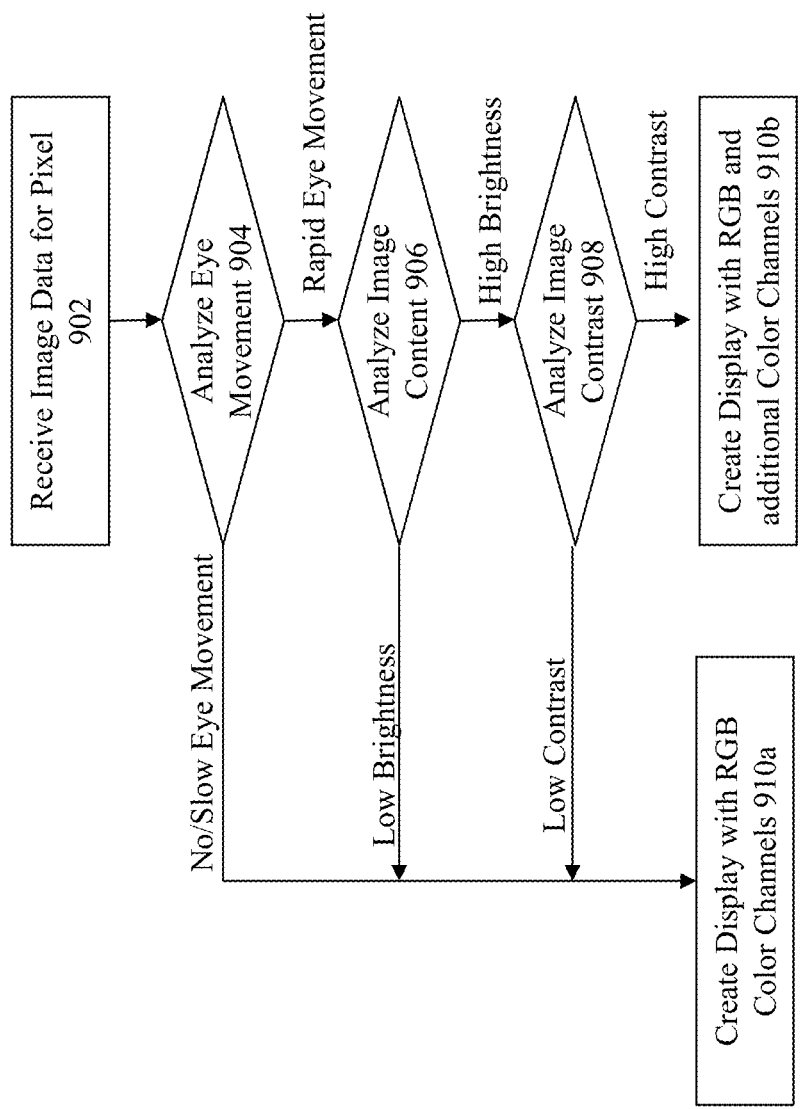
FIG. 8 shows a flowchart of an illustrative approach to make determinations based at least on part on eye movement or image content.

FIG. 8 shows a flowchart of an illustrative approach to make this determination. Using additional color channels may be useful to reduce the update rate and may reduce contrast for some color-sequential displays. As a result, it may be advantageous to use the additional color channels only at certain times. At 902, image data is received for a pixel to be displayed.

At 904, a determination is made whether the user's head or eyes are moving excessively. For example, eye-tracking cameras can be used to determine when the observer's eye is moving quickly. If the observer's eyes have no movement or a minimal amount of movement, then the display can be created using the conventional RGB channels at 910a. In contrast, at moments where the observer's eyes undergo rapid movement, the additional color channels can be enabled at 910b.

It is known that the severity of color-breakup depends on image content. In particular, high brightness and high contrast images cause the greatest problems. Therefore, at 906, a determination is made of the image content for brightness levels. If the image content includes relatively low brightness image data (e.g., below a threshold brightness level), then the display can be created using the conventional RGB channels at 910a. In contrast, where the image content includes relatively high brightness image data, the additional color channels can be enabled at 910b.

Similarly, at 908, a determination is made of the image content for image contrast levels. If the image content includes relatively low contrast (e.g., below a threshold contrast level), then the display can be created using the conventional RGB channels at 910a. On the other hand, where the image content includes relatively high contrast, the additional color channels can be enabled at 910b.

While FIG. 8 shows a set of criteria being used in a cascading set of if-then determinations, it is noted that any combination of one or more of these criteria (and others) may be used, either singly or in combination.

Therefore, what has been described are improved approaches to implement color sequential displays that can mitigate problems with conventional display technologies. Embodiments of the current invention reduce color-breakup by modifying the original color channels and adding one or more additional color channels derived from the original ones.

System Architecture

Figure 9:
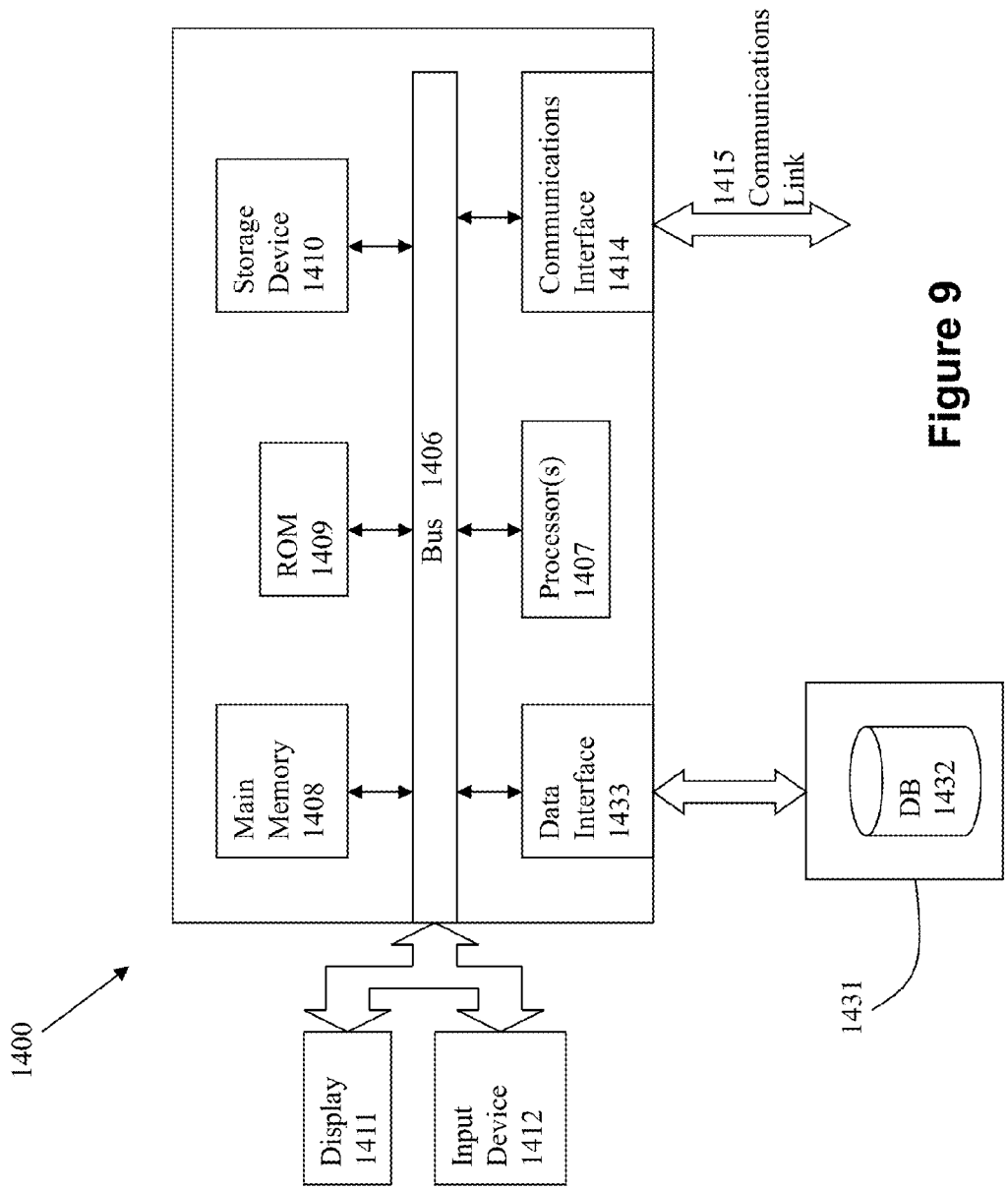
FIG. 9 illustrates a block diagram of a computing system suitable for implementing an embodiment of the present invention.

FIG. 9 is a block diagram of an illustrative computing system 1400 suitable for implementing an embodiment of the present invention, such as to implement the controller described above for controlling a color sequential display system. Computing system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. A database 1432 in a storage medium 1431 may be used to store data accessible by the system 1400 which is accessible through data interface 1433.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A system, comprising:
   a light source having a red light source, a green light source, and a blue light source;
   a display having at least one pixel corresponding to image data formed from light generated from a red channel for the red light source, a green channel for the green light source, and a blue channel for the blue light source; and
   a controller that controls operation of the light source and the display to display the at least one pixel, the controller modifying the red channel to create a reduced red channel, modifying the green channel to create a reduced green channel, and modifying the blue channel to create a reduced blue channel, wherein the controller forms a white channel from portions removed from the red channel, the green channel, and the blue channel, such that the at least one pixel is formed by sequential presentation in any order of the white channel, the reduced red channel, the reduced green channel, and the reduced blue channel.

2. The system of claim 1, wherein the light source comprises at least one of (a) multiple solid state light sources of different colors; (b) a color filter to form the red light source, the green light source, and the blue light source; (c) a color wheel; or (d) a beam splitter.

3. The system of claim 1, wherein the display comprises at least one of (a) a LCOS (liquid crystal on silicon) panel; or (b) a DMD (digital mirror device) mechanism.

4. The system of claim 1, wherein the red channel at pixel coordinate $(i,j)$ is represented as $r(i,j)$, the green channel at the pixel coordinate $(i,j)$ is represented as $g(i,j)$, and the blue channel at the pixel coordinate $(i,j)$ is represented as $b(i,j)$, where the white channel $w(i,j)$ is computed by:

$$w(i,j)=\min(r(i,j), g(i,j), b(i,j))$$

the reduced red channel $r'(i,j)$ is computed by:

$$r'(i,j)=r(i,j)-w(i,j)$$

the reduced green channel $g'(i,j)$ is computed by:

$$g'(i,j)=r(i,j)-w(i,j)$$

the reduced blue channel $b'(i,j)$ is computed by:

$$\text{Blue: } b'(i,j)=b(i,j)-w(i,j).$$

5. The system of claim 1, wherein the red channel at pixel coordinate $(i,j)$ is represented as $r(i,j)$, the green channel at the pixel coordinate $(i,j)$ is represented as $g(i,j)$, and the blue channel at the pixel coordinate $(i,j)$ is represented as $b(i,j)$, where the white channel $w(i,j)$ is computed by:

$$w(i,j)=\text{alpha}*\min(r(i,j), g(i,j), b(i,j)) \text{ where alpha}<1.0.$$

6. The system of claim 1, wherein the red channel at pixel coordinate $(i,j)$ is represented as $r(i,j)$, the green channel at the pixel coordinate $(i,j)$ is represented as $g(i,j)$, and the blue channel at the pixel coordinate $(i,j)$ is represented as $b(i,j)$, where the white channel $w(i,j)$ is computed by:

$$w(i,j)=\min(r(i,j), g(i,j), b(i,j)) \text{ for time t*alpha where alpha}<1.0.$$

7. The system of claim 1, wherein the white channel is presented for less time than any of the red channel, green channel, or blue channel.

8. The system of claim 1, wherein one or more additional channels are formed, the one or more additional channel comprising at least one of (a) a red-green channel; (b) a green-blue channel; or (c) a blue-red channel.

9. The system of claim 1, further comprising an eye-tracking camera, wherein the white channel is created upon detection by the eye-tracking camera of a threshold amount of eye movement.

10. The system of claim 1, wherein the white channel is created upon detection of image content having greater than a threshold level of brightness.

11. The system of claim 1, wherein the white channel is created upon detection of image content having greater than a threshold level of contrast.

12. A method, comprising:
   receiving instructions to display on a display device at least one pixel corresponding to image data formed from light generated from a red channel for a red light source, a green channel for a green light source, and a blue channel for a blue light source;
   modifying the red channel to create a reduced red channel;
   modifying the green channel to create a reduced green channel;
   modifying the blue channel to create a reduced blue channel;
   generating a white channel from portions removed from the red channel, the green channel, and the blue channel; and
   displaying the at least one pixel by sequential presentation in any order of the white channel, the reduced red channel, the reduced green channel, and the reduced blue channel.

13. The method of claim 12, wherein the red channel at pixel coordinate $(i,j)$ is represented as $r(i,j)$, the green channel at the pixel coordinate $(i,j)$ is represented as $g(i,j)$, and the blue channel at the pixel coordinate $(i,j)$ is represented as $b(i,j)$, where the white channel $w(i,j)$ is computed by:

$$w(i,j)=\min(r(i,j), g(i,j), b(i,j))$$

the reduced red channel r'(i,j) is computed by:

$$r'(i,j)=r(i,j)-w(i,j)$$

the reduced green channel g'(i,j) is computed by:

$$g'(i,j)=r(i,j)-w(i,j)$$

the reduced blue channel b'(i,j) is computed by:

Blue: $b'(i,j)=b(,j)-w(i,j)$.

14. The method of claim 12, wherein the red channel at pixel coordinate (i,j) is represented as r(i,j), the green channel at the pixel coordinate (i,j) is represented as g(i,j), and the blue channel at the pixel coordinate (i,j) is represented as b(i,j), where the white channel w(i,j) is computed by:

$$w(i,j)=\text{alpha}*\min(r(i,j), g(i,j), b(i,j)) \text{ where alpha}<1.0.$$

15. The method of claim 12, wherein the red channel at pixel coordinate (i,j) is represented as r(i,j), the green channel at the pixel coordinate (i,j) is represented as g(i,j), and the blue channel at the pixel coordinate (i,j) is represented as b(i,j), where the white channel w(i,j) is computed by:

$$w(i,j)=\min(r(i,j), g(i,j), b(i,j)) \text{ for time } t*\text{alpha where alpha}<1.0$$

16. The method of claim 12, wherein the white channel is presented for less time than any of the red channel, green channel, or blue channel.

17. The method of claim 12, wherein one or more additional channels are formed, the one or more additional channel comprising at least one of (a) a red-green channel; (b) a green-blue channel; or (c) a blue-red channel.

18. The method of claim 12, wherein the white channel is created upon detection by an eye-tracking camera of a threshold amount of eye movement.

19. The method of claim 12, wherein the white channel is created upon detection of image content having greater than a threshold level of brightness.

20. The method of claim 12, wherein the white channel is created upon detection of image content having greater than a threshold level of contrast.

21. A computer program product embodied on a non-transitory computer readable medium, the non-transitory computer readable medium having stored thereon a sequence of instructions which, when executed by a processor causes the processor to execute a method comprising:
receiving instructions to display on a display device at least one pixel corresponding to image data formed from light generated from a red channel for a red light source, a green channel for a green light source, and a blue channel for a blue light source;
modifying the red channel to create a reduced red channel;
modifying the green channel to create a reduced green channel;
modifying the blue channel to create a reduced blue channel;
generating a white channel from portions removed from the red channel, the green channel, and the blue channel; and
displaying the at least one pixel by sequential presentation in any order of the white channel, the reduced red channel, the reduced green channel, and the reduced blue channel.

22. The computer program product of claim 21, wherein the red channel at pixel coordinate (i,j) is represented as r(i,j), the green channel at the pixel coordinate (i,j) is represented as g(i,j), and the blue channel at the pixel coordinate (i,j) is represented as b(i,j), where the white channel w(i,j) is computed by:

$$w(i,j)=\min(r(i,j), g(i,j), b(i,j))$$

the reduced red channel r'(i,j) is computed by:

$$r'(i,j)=r(i,j)-w(i,j)$$

the reduced green channel g'(i,j) is computed by:

$$g'(i,j)=r(i,j)-w(i,j)$$

the reduced blue channel b'(i,j) is computed by:

Blue: $b'(i,j)=b(i,j)-w(i,j)$.

23. The computer program product of claim 21, wherein the white channel is presented for less time than any of the red channel, green channel, or blue channel.

24. The computer program product of claim 21, wherein one or more additional channels are formed, the one or more additional channel comprising at least one of (a) a red-green channel; (b) a green-blue channel; or (c) a blue-red channel.

25. The computer program product of claim 21, wherein the white channel is created upon detection by an eye-tracking camera of a threshold amount of eye movement.

26. The computer program product of claim 21, wherein the white channel is created upon detection of image content having greater than a threshold level of brightness.

27. The computer program product of claim 21, wherein the white channel is created upon detection of image content having greater than a threshold level of contrast.

* * * * *